July 28, 1959  J. W. RHODES  2,896,474
MOTION TRANSMITTING CONNECTION
Filed April 12, 1956  2 Sheets-Sheet 1
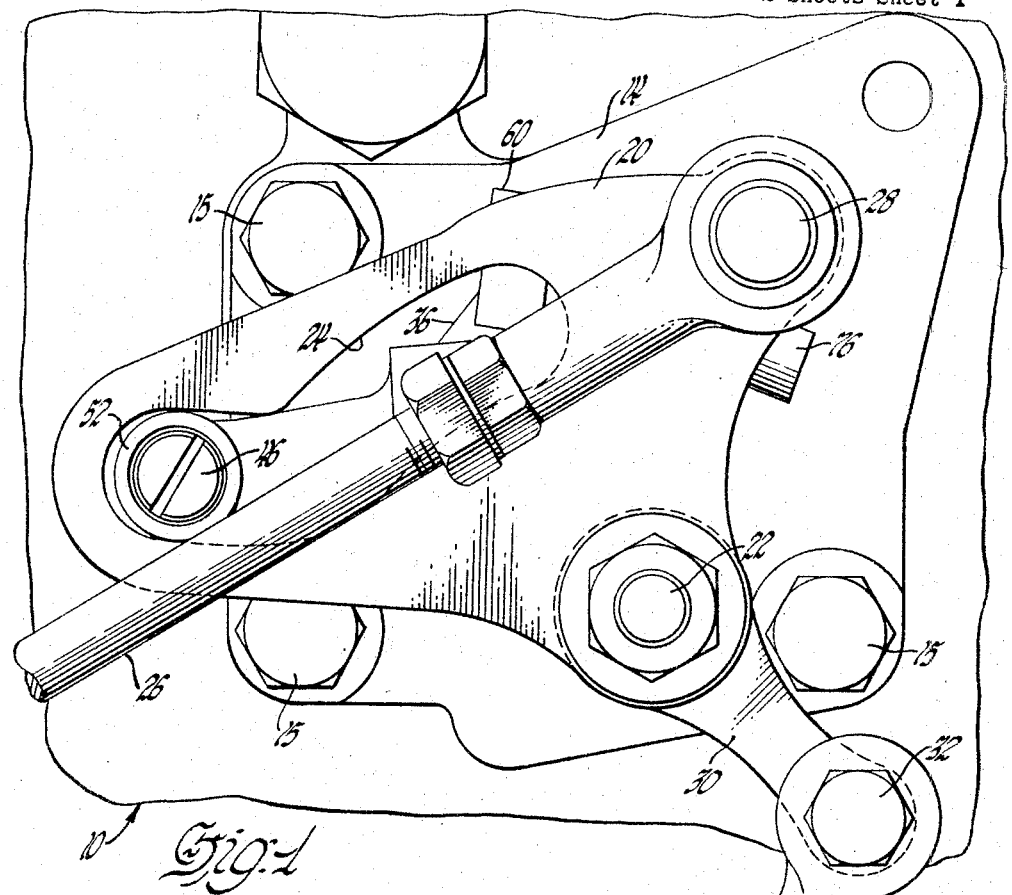
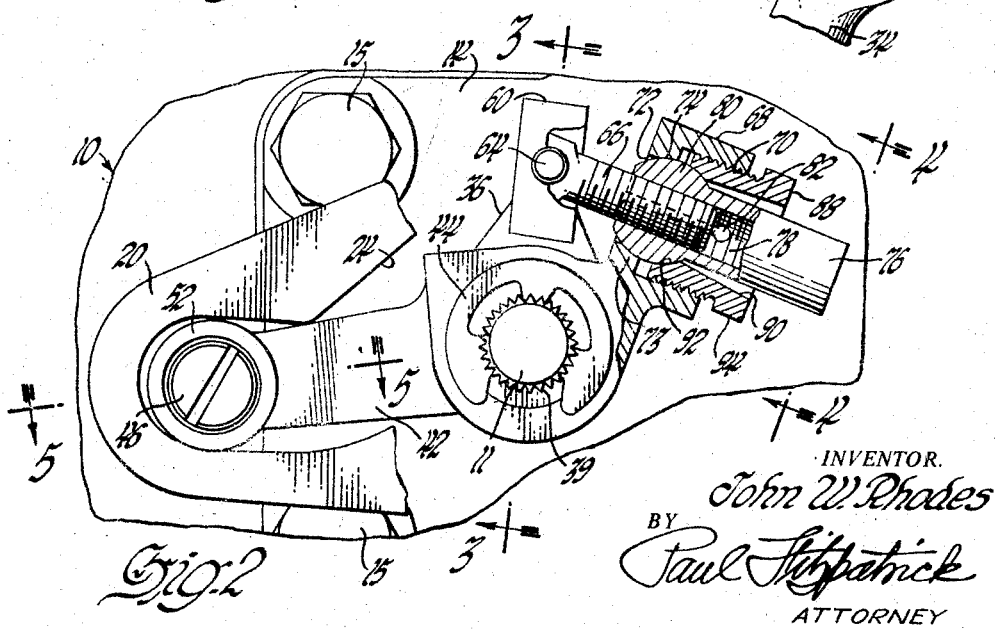
INVENTOR.
John W. Rhodes
BY Paul Fitzpatrick
ATTORNEY July 28, 1959 J. W. RHODES 2,896,474
MOTION TRANSMITTING CONNECTION
Filed April 12, 1956 2 Sheets-Sheet 2

INVENTOR.
John W. Rhodes
BY Paul Fitzpatrick
ATTORNEY

United States Patent Office 2,896,474
Patented July 28, 1959

2,896,474
MOTION TRANSMITTING CONNECTION

John W. Rhodes, Indianapolis, Ind., assignor to General Motors Corporation, Detroit, Mich., a corporation of Delaware Application April 12, 1956, Serial No. 577,772

4 Claims. (Cl. 74—522)

This invention relates to a motion transmitting connection between relatively movable members and more particularly to an adjustable motion transmitting mechanical connection between relatively movable members.

In many power plant installations, the speed governor for the power plant is set by the throttle through a control mechanism to set the allowable speed of the power plant for each throttle position. The operating characteristics of individual power plants vary and the control mechanism must, therefore, be adjustable in order to accurately adjust the setting of the speed governor in accordance with the operating characteristics of the power plant. This invention, in its preferred embodiment, provides an adjustable motion transmitting mechanical connection which may be used with such control mechanisms to provide adjustment of the setting of the speed governor in accordance with the operating characteristics of the individual power plant.

An object of this invention is to provide a new and improved motion transmitting mechanical connection between relatively movable members. Another object of this invention is to provide a new and improved adjustable motion transmitting mechanical connection between relatively movable members. A further object of this invention is to provide a new and improved adjustable motion transmitting mechanical connection between relatively movable members to adjust the relative position of the members with respect to each other and hold the members in any adjusted position.

These and other objects of this invention will be readily apparent from the following specification and drawings, in which:

Figure 1 is a view of a control mechanism for a power plant embodying an adjustable motion transmitting mechanical connection according to this invention;

Figure 2 is a view of a portion of Figure 1 with parts broken away for clarity of illustration;

Figure 3:
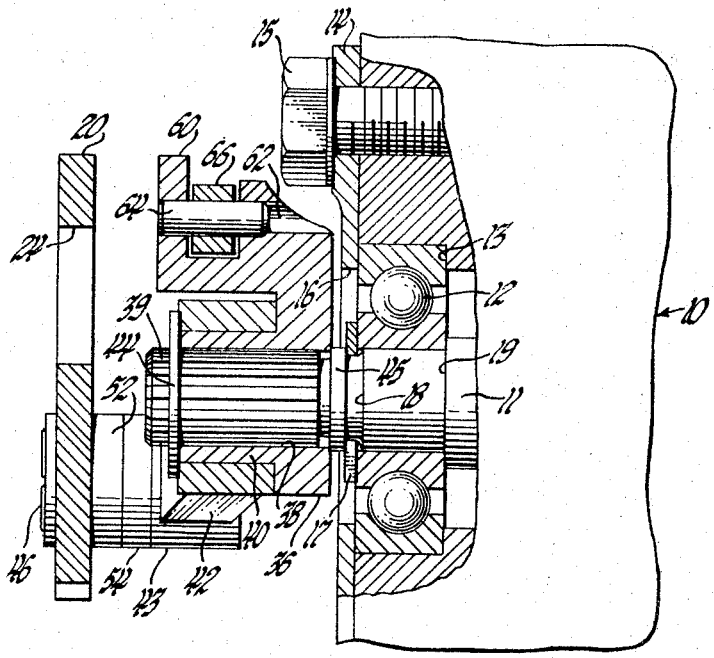
Figure 3 is a sectional view taken on the plane indicated by line 3—3 of Figure 2.

Referring now to Figures 1 and 3 of the drawings, a speed governor 10 includes a governor shaft 11 rotatably supported at one end thereof by a thrust bearing 12. The outer race of the thrust bearing fits within a shoulder portion 13 of the speed governor and a cover plate 14 bolted at 15 to the governor engages the outer race of the bearing to retain the bearing in place. The cover plate includes an aperture 16 to allow shaft 11 to project outwardly of the governor. A retaining ring 17 fitting within an annular groove 18 in shaft 11 engages one side of the inner race of bearing 12 to hold the shoulder portion 19 of shaft 11 in engagement with the other side of the inner race of the bearing and thereby fix the shaft to the inner race of the bearing. Shaft 11 is operatively connected to the mechanism (not shown) which sets compression into the governor speeder spring to set the allowable speed of the power plant in accordance with throttle position. A cam plate 20 is rotatably mounted on the speed governor at 22 and includes a cam slot 24. A link 26 is pivotally secured at 28 to the cam plate by means of a ball and socket universal type connection. Link 26 is operatively connected to the throttle (not shown) to rotate cam plate 20 about pivot 22 to various positions as the throttle is moved to various positions. The cam plate includes a lateral projection 30 which is pivotally connected at 32 to a link 34. Link 34 is part of the fuel control mechanism and controls the opening and closing movement of the fuel valve (not shown) to set the fuel flow rate to the power plant. Thus, it can be seen that upon movement of the throttle, cam plate 20 will be rotated about its pivotal support 22 and in turn will shift link 34 to open or close the fuel valve.

Figure 5:
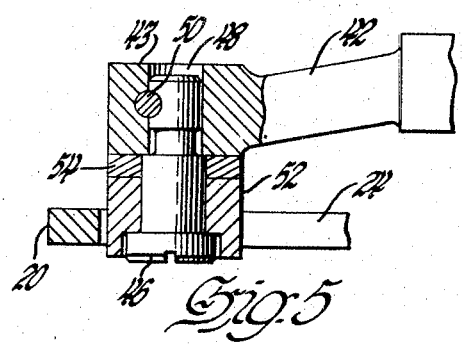
Figure 5 is a sectional view on the plane indicated by line 5—5 of Figure 2.

Referring now particularly to Figures 2 and 3 of the drawings, an arm 36 includes a splined bore 38 which receives the splined end 39 of shaft 11. Rotatably mounted on the sleeve portion 40 of arm 36 is another arm 42 provided with an annular boss 43. A retaining ring 44 fits within an annular groove in the splined end 39 of shaft 11 and engages arms 36 and 42. The retaining ring retains arm 42 on arm 36 and retains arm 36 on the splined end 39 of shaft 11 in engagement with an annular flange 45 of the shaft. Arm 42 can thus rotate relative to arm 36 about sleeve portion 40 while arm 36 must rotate with shaft 11. A headed stud 46, Figure 5, fits within a bore 48 in boss 43 of arm 42 and is retained therein by a pin 50 which fits within grooves in both the stud and the boss. A roller 52 is rotatably mounted on stud 46 and a resilient washer 54 is provided between the roller and boss 43. Roller 52 rides in cam slot 24.

As previously mentioned, the cam plate 20 is rotated about its pivot 22 on the governor by link 26 upon movement of the throttle. As the cam plate swings about its pivot 22, the cam slot 24 of the plate will rotate arm 42 about the sleeve portion 40 of arm 36 about an axis defined by the axis of rotation of the governor shaft 11. Since rotation of the governor shaft 11 sets the governor speeder spring, some means of connecting arm 42 to arm 36 must be provided so that movement of arm 42 will also result in movement of arm 36 and rotation of shaft 11. Also, each power plant has different operating characteristics and the allowable speed of the power plant must be set in accordance with these operating characteristics to insure maximum efficiency. Thus, by providing arms 36 and 42 which are movable relative to each other to various positions, the relative position of the arms with respect to each other may be changed as needed in accordance with the operating characteristics of the individual power plant to change the setting of the speed governor for a particular throttle position.

Figure 4:
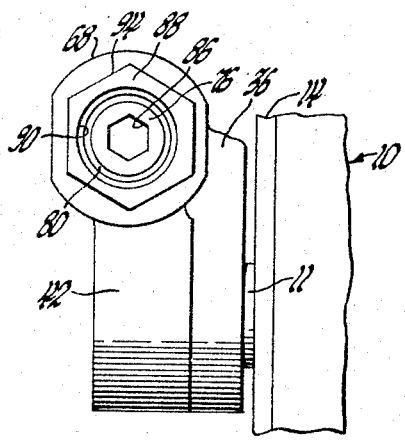
Figure 4 is a view taken on the plane indicated by line 4—4 of Figure 2.

This invention provides an adjustable motion transmitting mechanical connection between arms 36 and 42 so that the arms may be adjusted relative to each other and may then be fixed in the adjusted position so that movement of arm 42 will result in movement of arm 36 and rotation of the governor shaft 11 through the required arc. Referring now particularly to Figures 2, 3, and 4, arm 36 includes a laterally extending bifurcated portion 60 provided with an aperture 62. A pin 64 fixedly mounted within aperture 62 swingably mounts a threaded stud 66. The axis of swinging of the threaded stud defined by pin 64 is parallel and in spaced relationship to the axis of rotation of the governor shaft 11 and arms 36 and 42. Arm 42 includes a laterally extending annular housing portion 68 provided with a threaded bore 70. An opening 72 is provided in the base wall 73 of the housing portion and a spherical seat 74 is provided on the base wall immediately adjacent opening 72.

A nut 76 includes a threaded bore 78 threadedly receiving stud 66 and a ball portion 80 rotatably mounted on the spherical seat 74. A number of annularly spaced slots 82 in the nut extend from immediately adjacent the ball portion 80 to the ball end of the nut so as to impart a slight radial resiliency to the ball portion of the nut. The threaded bore 78 of the nut terminates at one end in a polygonally shaped opening 86 to receive an Allen wrench which may be used to rotate the nut and the ball portion 80 relative to its spherical seat 74. A lock nut 88 threadedly received within bore 70 includes a tapered bore 90 of a size greater than nut 76. A spherical seat 92 immediately adjacent one end of bore 90 is adapted to engage the ball portion 80 of nut 76 as nut 88 is threaded within bore 70 to fix the position of the ball portion on seat 74. When the lock nut 88 is threaded into bore 70 in engagement with the ball portion 80 of nut 76, the position of the ball portion 80 on seat 74 is fixed to prevent rotation of nut 76. The relative position of arms 36 and 42 will then be fixed since stud 66 cannot be threaded into or out of nut 76 to change the position of the arms with respect to each other. The annularly spaced slots 82 in nut 76 permit the nut to contract and securely grip the threads on stud 66 when nut 88 is tightened. Tightening of nut 88 thus performs two functions, since it secures the ball portion 80 of nut 76 in seat 74 to lock nut 76 against rotation and also causes nut 76 to securely grip the threads of stud 66 to thereby eliminate any movement between the nut and stud due to wear of the mating threads or vibration. Although it is preferred that the ball portion 80 of nut 76 be of spherical shape, seats 74 and 92 may be spherical or conical since the assembly will function equally as well with either shape seat.

If it is desired to change the relative position of arms 36 and 42 with respect to each other, a wrench is fitted on the polygonally shaped flange 94 of nut 88 to thread the nut out of bore 70 until the seat 92 of the nut does not tightly engage the ball portion 80 of nut 76. An Allen wrench can then be fitted within opening 86 of nut 76 to rotate the nut. As the nut is rotated, the ball portion 80 of the nut will rotate relative to the spherical seat 74 and pin 66 will be threaded either into or out of bore 78 of nut 76 to swing arm 42 either toward or away from arm 36. After the relative position arm 42 has been adjusted, nut 88 is again threaded into housing 68 so as to tightly engage the ball portion 80 of nut 76 and fix the position of the ball portion on seat 74 to thereby fix the relative position of the arms.

The threaded pin 66 is rotatably mounted on pin 64 which defines an axis parallel to the axis of rotation of the governor shaft 11 and arms 36 and 42 as previously described. By providing the ball portion 80 of nut 76 and the spherical seat 74, the nut is rotatable about an infinite number of axes so as to adjust the relative position of arms 36 and 40 with respect to each other by either moving arm 42 toward or away from arm 36. The tapered bore 90 of nut 88 has its portion of least diameter adjacent seat 92 to allow nut 76 to be moved to various positions with respect to nut 88 as the ball portion 80 of nut 76 is rotated on seat 74. Thus, the axes of rotation of nuts 76 and 88 may be coaxial as shown, or the axis of rotation of nut 76 may be angularly displaced with respect to the axis of rotation of nut 88. The angular displacement of the axes is limited by engagement of nut 76 with the wall of bore 90. It will be noted that regardless of the relative position of the arms with respect to each other, the mechanical connection of this invention will be operative to retain the arms in this position and also transmit motion from arm 42 to arm 36 to rotate the governor shaft 11 as the throttle position is changed.

Thus, this invention provides an improved motion transmitting mechanical connection between relatively movable members which is operative to adjust the position of the members with respect to each other and to also hold the members in any adjusted position. Although the motion transmitting connection has been shown and described in conjunction with the control mechanism of a power plant, it is obvious that it will have many other and varied uses wherein similar problems arise in conjunction with the transmission of motion and the adjustability of the members between which motion is transmitted.

While a specific embodiment of this invention has been shown and described, various changes and modifications may be made within the scope and spirit of the invention.

I claim:

1. The combination comprising, first and second relatively movable members, one of said members having an opening therein and a spherical seat adjacent said opening, first means swingably supported on the other of said members and extending within said opening, ball means rotatably supported by said seat, adjustable means operatively interconnecting said first means and said ball means and adjustable upon rotation of said ball means to adjust the relative spacing of said members with respect to each other, and means fixing the position of said ball means with respect to said seat to thereby fix the position of said adjustable means upon adjustment of the relative position of said members.

2. The combination comprising, first and second relatively movable members, one of said members having a housing therein and an opening into said housing, spherical seat means in said housing adjacent said opening, first means swingably supported on the other of said members and projecting within said opening, ball means supported on said seat means for rotation relative thereto, adjustable means operatively interconnecting said first means and said ball means and adjustable upon rotation of said ball means with respect to said seat means, and means supported by said housing and engageable with said ball means to fix the position of said ball means with respect to said seat means and thereby fix the position of said adjustable means upon adjustment of the relative position of said members.

3. The combination comprising, first and second relatively movable members, one of said members having a spherical seat thereon, first means swingably supported on the other of said members and having a threaded projection, ball means rotatably supported on said seat and having a threaded bore therein to threadedly receive said projection whereby rotation of said ball means relative to said seat will adjust the relative position of said members with respect to each other, and means fixing the position of said ball means with respect to said seat to thereby fix the relative position of said members upon adjustment thereof.

4. The combination comprising, first and second relatively movable members, one of said members having a threaded bore thereon and a base wall at one end of said bore, an opening in said base wall and a spherical seat on said base wall adjacent said opening, threaded means swingably supported on the other of said members and projecting into said bore through said opening, ball means fitting within said bore and rotatably supported on said spherical seat, said ball means having a threaded bore therein to threadedly receive said threaded means whereby the relative position of said members with respect to each other may be adjusted upon rotation of said ball means relative to said seat, and means threadedly received by said threaded bore and having spherical seat means for engaging said ball means to fix the position of said ball means with respect to said spherical seat on said base wall and thereby fix the relative position of said members upon adjustment thereof.

References Cited in the file of this patent

UNITED STATES PATENTS

| | | |
|---|---|---|
| 330,791 | Leavitt | Nov. 17, 1885 |
| 757,143 | Reilly | Apr. 12, 1904 |
| 1,906,366 | Burns | May 2, 1933 |
| 2,550,732 | Tack | May 1, 1951 |
| 2,750,675 | Soring | June 19, 1956 |